United States Patent [19]
Diot et al.

[11] Patent Number: 5,133,787
[45] Date of Patent: Jul. 28, 1992

[54] ENCLOSURE AND APPARATUS FOR SEPARATING GAS MIXTURES BY ADSORPTION

[76] Inventors: Christian Diot, 11, rue du Noisetier -Clos Notre Dame, 77340 Pontault-Combault; Dominique Larrieu, 48, rue de la Sourderie, 78180 Montigny-le-Brettoneux; Alain Rivero, 4, rue Henri de Bournazel, 75014 Paris; Xavier Vigor, 27-29, rue Rieussec, 78220 Viroflay, all of France

[21] Appl. No.: 662,745

[22] Filed: Mar. 1, 1991

[30] Foreign Application Priority Data

Mar. 2, 1990 [FR] France ................. 90 02615

[51] Int. Cl.$^5$ ............................................. B01D 53/04
[52] U.S. Cl. ........................................ 55/179; 55/387; 55/476
[58] Field of Search ............... 55/74, 75, 161–163, 55/179, 180, 316, 387, 389, 476

[56] References Cited

U.S. PATENT DOCUMENTS

| 780,682 | 1/1905 | Posch | 55/476 X |
|---|---|---|---|
| 1,706,676 | 3/1929 | Paasche | 55/476 X |
| 1,821,549 | 9/1931 | Hornor et al. | 55/316 X |
| 2,359,959 | 10/1944 | Anderson | 55/387 X |
| 2,669,318 | 2/1954 | Briggs | 55/387 |
| 2,758,719 | 8/1956 | Line | 55/387 X |
| 3,080,977 | 3/1963 | Jones | 55/387 X |
| 3,353,339 | 11/1967 | Walter | 55/387 X |
| 3,490,205 | 1/1970 | Hauser | 55/179 |
| 3,581,782 | 6/1971 | Onufer | 55/387 X |
| 3,785,164 | 1/1974 | Wrenn, Jr. | 55/389 X |
| 3,868,239 | 2/1975 | Visser | 55/389 |
| 4,162,289 | 7/1979 | Gomez et al. | 55/387 X |
| 4,322,228 | 3/1982 | Myers et al. | 55/180 X |
| 4,373,938 | 2/1983 | McCombs | 55/160 |
| 4,659,467 | 4/1987 | Spearman | 55/389 X |
| 4,750,465 | 6/1988 | Rediker, Jr. et al. | 55/387 X |
| 4,875,911 | 10/1989 | Mizuno et al. | 55/180 X |
| 4,971,771 | 11/1990 | Stahl | 55/476 X |

FOREIGN PATENT DOCUMENTS

| 0250627 | 1/1988 | European Pat. Off. . | |
| 852538 | 10/1952 | Fed. Rep. of Germany . | |
| 2215544 | 8/1974 | France . | |
| 129169 | 1/1978 | German Democratic Rep. | 55/389 |
| 236678 | 6/1986 | German Democratic Rep. | 55/179 |
| 55-094618 | 7/1980 | Japan | 55/389 |

Primary Examiner—Robert Spitzer

[57] ABSTRACT

Enclosure for separating a component from a gas mixture by adsorption, of the elongated structure type including at least one granular adsorbing product and having a device for introducing and withdrawing gas to ensure a gas circulation in longitudinal direction relative to the enclosure of the elongated structure type. The enclosure is a gas bottle with closed bottom and a cylindrical lateral wall narrowing into a neck provided with an introduction-withdrawing head having a first axial duct extending into a dipping tube reaching at a short distance from the bottle bottom and a second duct opening inside the bottle at the level of the bottle neck. Use for the separation of gas mixtures, such as for the production of hydrogen.

10 Claims, 3 Drawing Sheets

ENCLOSURE AND APPARATUS FOR SEPARATING GAS MIXTURES BY ADSORPTION

BACKGROUND OF INVENTION (a) Field of the Invention

The present invention concerns an enclosure for the separation of a component from a gas mixture by adsorption, of the type having an elongated structure including at least a granular adsorbing product and having gas introduction and withdrawing means ensuring a gas circulation in longitudinal direction relative to said enclosure.

(b) Description of Prior Art

Such adsorption enclosures are generally used in a cyclic process for the regeneration of adsorbing products by pressure variation (type "PSA") and for this purpose are found in an apparatus in the form of one or more vertically or horizontally disposed columns, each being provided with gas introduction means at one column end and gas withdrawing means at the other column end.

Such columns are made on request for a given apparatus, so that their cost is substantial, because identical productions are carried out in very small number, even as a single specimen, so that we are far from the manufacturing costs that could be expected if this type of adsorption enclosures could be made in large number.

SUMMARY OF INVENTION

It is an object of the present invention to provide an adsorption enclosure whose manufacturing cost may be substantially lowered to a minimum level, since the structure of its enclosure is normally manufactured in very large number for other applications in the field of gases. According to the invention, an enclosure is a gas bottle with a closed bottom and a cylindrical lateral wall terminating into a neck, which is provided with introduction-withdrawing means in the form of an introduction-withdrawing head with a first axial duct extending into a dipping tube reaching a point at a short distance from the bottom of the bottle and a second duct opening inside the bottle at the level of said bottle neck. Consequently, the invention utilizes very well known gas bottles, which are merely filled with an adsorbin granular product and which are provided with introduction and withdrawing means capable of ensuring a longitudinal circulation of the gases from the neck towards the bottom or vice versa. Such bottles are manufactured in series by a few manufacturers with standard dimensions in so far as diameter (generally comprised between 200 and 300 mm), height (generally comprised between 1000 mm to 2000 mm), capacity (generally between 20 liters and 100 liters), inner diameter of the neck (between 15 and 35 mm, generally of conical shape converging towards the interior of the bottle), with a concave, or convex or flat bottom, all in a manner to contain small volumes of gas under pressure (of the order of 10 Nm$^3$ under 200 bars).

The adaptation of such a known bottle to an adsorption bottle requires the presence of the granular product and also of the introduction-withdrawing head with dipping tube, so that during the introduction of the granular adsorbing product, the volume that the dipping tube later on occupies should be considered, and, in the cases where the bottle is used with the bottom in upward position, one should also consider the additional top volume which is free of any granular product, in which the dipping tube opens and which constitutes a chamber for the distribution of gas which is either delivered by the dipping tube, or withdrawn and collected by the dipping tube.

Some particular embodiments of an adsorption bottle according to the invention which can be used separately or in any combination will now be described in detail:

- Advantageously, the second duct is annular and exteriorly coaxial to said dipping tube constituting the first duct;
- The dipping tube ends close to the bottom of the bottle by means of a plurality of openings of smaller dimension than the size of an adsorbing granular material;
- The dipping tube ends in the immediate vicinity of the bottom by means of part of a transverse section which is progressively restricted;
- The dipping tube is made of two tubes which slide into one another with a total longitudinal extension substantially equal to the height of the bottle;
- The introduction means is adapted to correspond to the first duct of the dipping tube, while the withdrawing means is adapted to correspond to a second duct at the level of the neck of the bottle, or vice versa, the introduction means is adapted to correspond to the second duct at the level of the neck while the withdrawing means is adapted to correspond to the first duct of the dipping tube;
- The introduction duct has a larger cross-section than the withdrawing duct.

It is also an object of the invention to provide an apparatus for separating a gas mixture, of the type comprising a plurality of adsorption enclosures, possibly a reservoir for storing the gas mixture to be treated, possibly a reservoir to storing a dilution-flushing gas or other reservoirs required during any cycle with pressure variation of the type PSA, the assembly being interconnected by means of ducts and valves so as to sequentially and for each adsorption enclosure ensure a step of production under pressure, a step of depressurization, possibly a step of dilution-flushing at low pressure, a step of repressurization under pressure and which is characterized in that said adsorption enclosures and the possible storage containers are made of a plurality of bottles of standard sizes, possibly grouped on introduction-withdrawing ramps, the bottles constituting adsorption enclosures being of the type described above.

The production of the adsorption bottles from commercial bottles, of relatively low volume, therefore enables to produce modular assemblies with one or more adsorption bottles, generally (but not necessarily) associated with a plurality of storage bottles, distributed in appropriate number depending on whether we are dealing with the storage of the mixture to be treated, the storage of the treated mixture, or the storage of a dilution gas or other storage, all of which can be mounted within a single frame-support.

BRIEF DESCRIPTION OF DRAWINGS

The invention is now described, by way of example, with reference to the annexed drawings in which.

DESCRIPTION OF PREFERRED EMBODIMENTS

Figure 1:
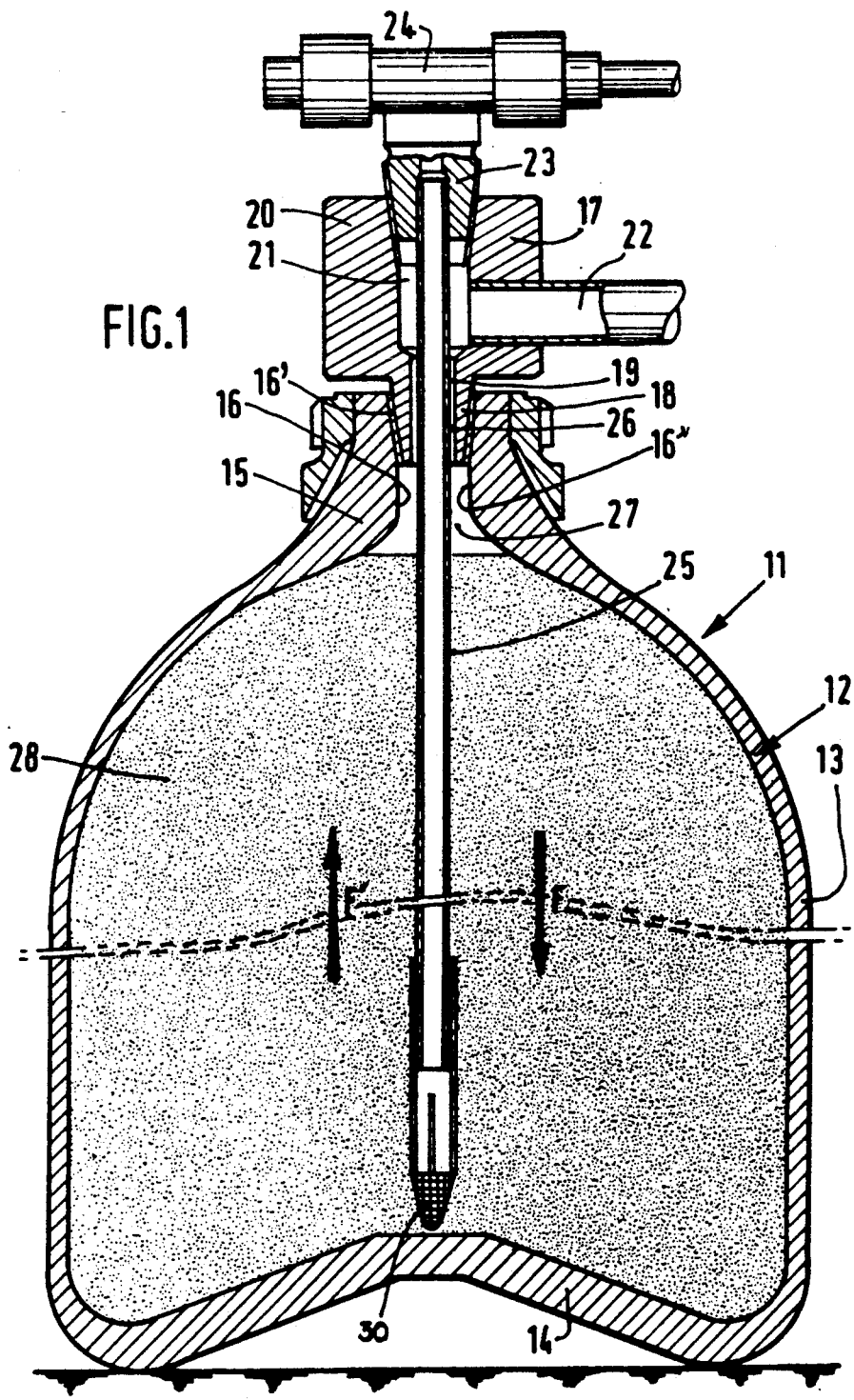
FIG. 1 is a cross-section view, with the central part being cut away, of an adsorption bottle according to the invention, operating with the bottom in downward position.

With reference to FIG. 1, an adsorption bottle 11 is made of a bottle per se, of known design 12 with a lateral wall 13 and bottom 14 which is here represented with a concave shape, but which could also be convex or flat. The lateral wall 13 narrows towards the upper portion into a neck 15 constituting a duct 16 having an inlet portion of conical shape 16', followed, towards the interior of the bottle, by a cylindrical duct 16".

An introduction-withdrawing head 17 is mounted in the neck 15 and this head 17 includes for this purpose projection 18 threadedly engaged in part 16' in which it is sealingly maintained. This projection 18 including axial duct 19 extends into a large body 20 with an axial duct opening into a cavity 21 which communicates with a transverse duct 22. A plug 23 is threadedly and sealingly mounted at the upper end of the axial duct 21, said plug being unitary with a ramp 24 and carrying a dipping tube 25. While allowing for an interstial space in duct 19 of projection 18, tube 25 extends therethrough until its end 30 is at a very small distance from bottom 14 of the bottle 12. This arrangement enables to provide on the one hand a first gas duct via ramp 24, plug 23, dipping tube 25 extending from one external end through the neck of the bottle 15 to the immediate vicinity of the bottom of the bottle 14, on the other hand a second duct via duct 22, interstial space 26 between ducts 21-19 and dipping tube 25 to immediately open interiorly at 27 in the vicinity of neck 15.

Such an adsorption bottle 11 is first produced by filling the bottle per se (from which its introduction-withdrawing head has been removed) with a granulated adsorbing product 28, so as however to allow a free volume enabling the later insertion of the dipping tube 25 of the introduction-withdrawing head.

In the embodiment represented in FIG. 1, the adsorption bottle operates with the bottom in downward position and the gas to be treated is introduced through duct 22 to pass in the second duct 26 at the top of the adsorbing material and flows downwardly in the direction of arrow F through the adsorbing mass 28, and is collected at the lower end 30 of dipping tube 25 which carries the gas under treatment toward the withdrawing ramp 24. In this embodiment, the interstitial duct 26 for introducing the gas to be treated has a larger cross-section than the inner cross-section of the dipping tube 25 forming the withdrawing duct, and is preferably within the ratio of flows introduced and withdrawn (the latter being inferior to the flow introduced by a value equal to the flow of gas trapped in the adsorbing material).

On the contrary, if the first duct formed by the dipping tube 25 is used as an introduction duct (gas circulating upwardly in the adsorbing mass according to arrow F' to be collected at the level of the second duct 26 used as withdrawing duct), it is the cross-section of the dipping tube 25 which would be larger than the cross-section of the annular duct 26.

Figure 2:
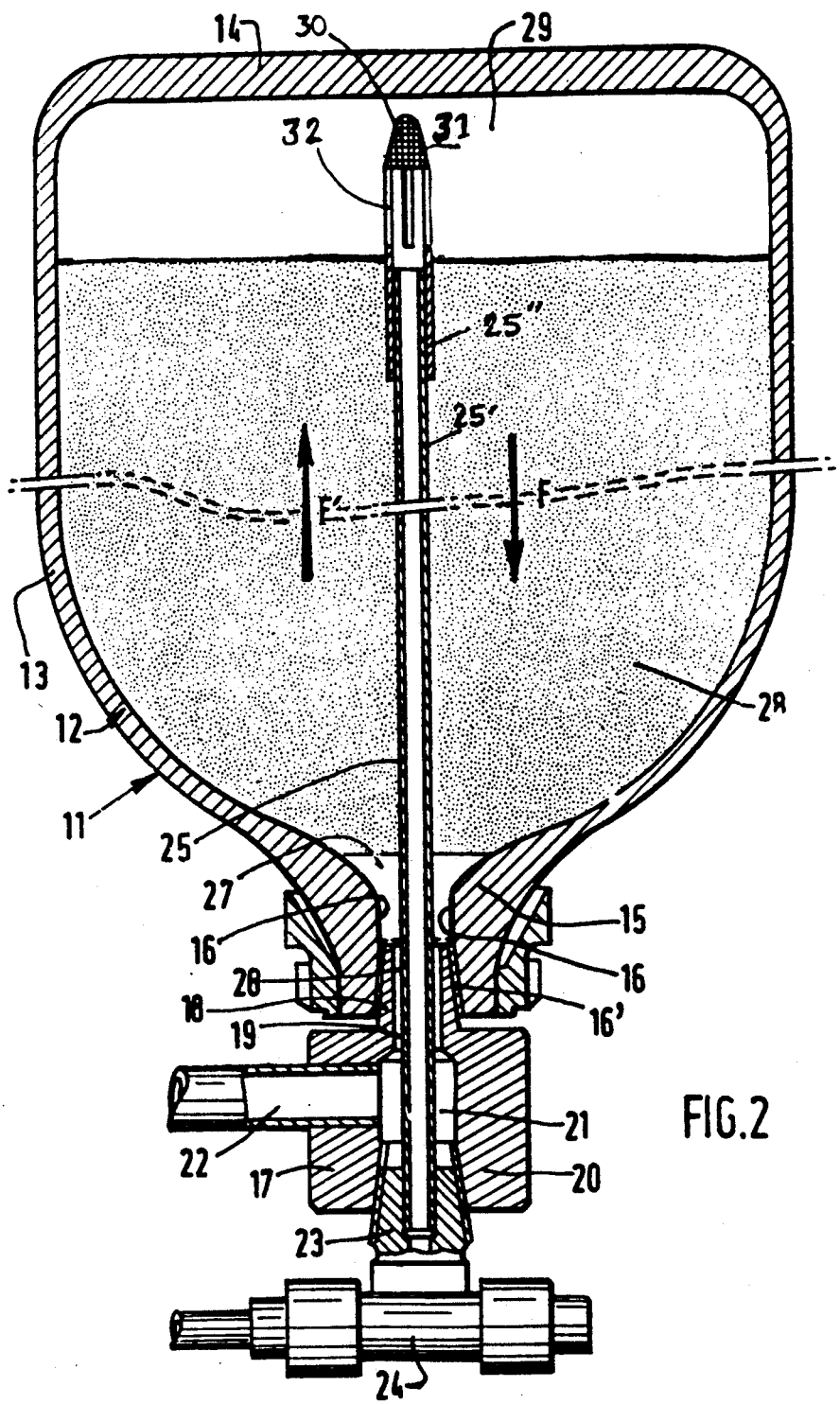
FIG. 2 is a view identical to FIG. 1 of a bottle operating with the bottom in upward position.

According to FIG. 2, an adsorption bottle of the same type with flat bottom 14 is here always mounted vertically, but with the bottom 14 in upward position and the introduction-withdrawing head in downward position. Contrary to the preceding case, slightly less adsorbing granular material has been introduced, so as to provide an upper portion of gas distribution 29 free of any granular material, in which the end 30 of the dipping tube 25 protrudes. Also according to this embodiment, the gas may be introduced through the dipping tube 25 (downward circulation according to arrow F), or collected by the dipping tube 25 (upward circulation according to arrow F').

The dipping tube 25 may be made of two concentric tubes 25' and 25" sliding into one another and preferably its end portion 30 is conical to facilitate the introduction of the tube in the mass of granular adsorbing material. It is provided at its end with openings of small diameter 31 and/or with narrow slits 32 preventing any risk of introduction therein of adsorbing granular material.

Figure 3:
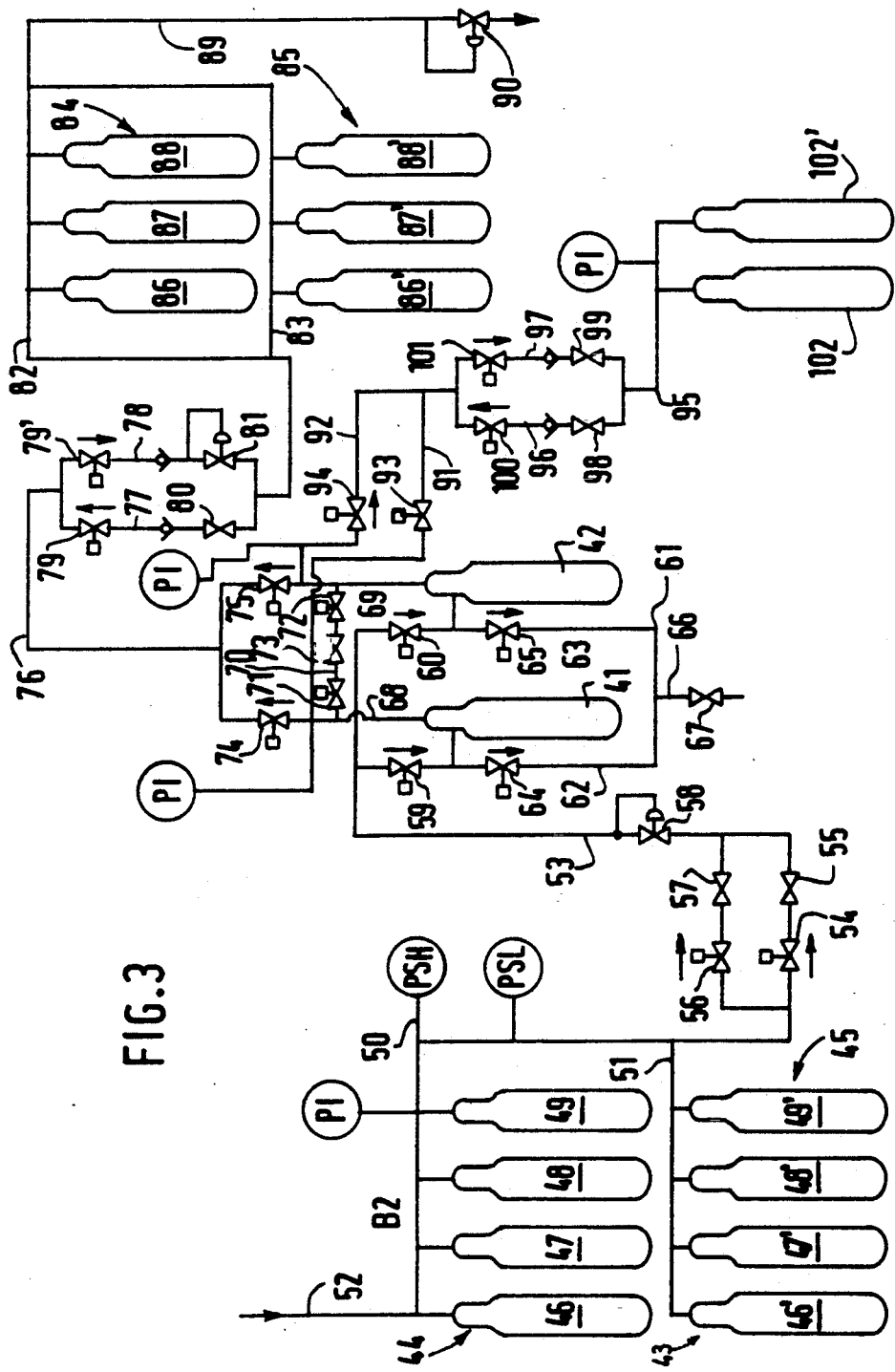
FIG. 3 is a schematic view of an adsorption apparatus according to the invention.

With reference to FIG. 3, a purifying apparatus is here provided with two adsorption bottles 41, 42, a storage container for the gas to be treated 43 formed of two groups 44 and 45, each comprising four bottles 46, 47, 48, 49 (46', 47', 48', 49') connected in parallel with two distributing ramps 50 and 51, the latter being connected to a feeding duct 52 and to a duct 53 joining bottles 41 and 42, including a loading circuit with electromagnetic valve 54 and flow controller 55 in parallel with a recompression circuit with electromagnetic valve 56 and flow controller 57, pressure regulator 58 (which can be replaced by a flow meter regulator) of the inlet valves 59, 60 towards bottles 41, 42 respectively.

A circuit of residual gas 61 includes, for each bottle 41, 42, individual ducts 62, (63) with electromagnetic valves 64, (65) and a common discharge duct 66 with flow controller 67.

A circuit of gas production includes ducts 68, 69, bridged by means of a duct 70 with valves 71, 72 and flow controller 73, and extending with electromagnetic valves 74 and 75 towards a common duct 76 with double parallel circuit, 77, (78), each including two valves 79 and 79', a flow regulator 80 on line 77 and a pressure regulator (or flow regulator) 81 on line 78, to reach two ramps 82, 83 each servicing a group 84 (85) of three bottles 86, 87, 88 (86', 87', 88') for storing treated gas, connected to a common collector 89 with regulator 90 for producing a treated gas with regulator 90.

The production ducts 68, 69 are each connected by means of a duct 91 (92) with valve 93 (94) with a common duct 95 including two circuits in parallel 96 (97) with valve 100, 101 and regulator 98 (99), reaching two bottles for storing dilution-flushing gas 102-102'.

The storage bottles whether they are used for the gas to be treated (bottles 46 (46'), 47 (47'), . . . ), or for gas treated 86 (86'), 87 (87'), for dilution-flushing gas 102 (102') are represented here as simple bottles with a simple filling-withdrawing head, with single neck duct, without dipping tube nor adsorbent material, contrary to adsorption bottles 41 and 42 which are in conformity to the bottles described in FIGS. 1 and 2. However, these bottles are also commercial bottles, preferably—but this is not indispensable—of the same structure and normal volume as the bottles from which the adsorption bottles 41 and 42 are prepared.

All these bottles, whether for adsorption or storing are grouped, with duct and valve in one or more bottle network(s) in a metallic frame-support which can easily be displaced by means of a crane and a truck.

The main application of the invention is the production of hydrogen from industrial mixtures including, in addition to hydrogen, nitrogen, $CH_4$, $CO$, $CO_2$, $C_nH_n$ or other mixture at flows of 20 to 100 N/m$^3$/h, and pressures of 1 to 200 bars.

We claim:

1. An adsorber unit for separating a gaseous component from a gaseous mixture, comprising a container of the type and configuration normally used for storing pressurized gas defining an inner space and having, at one end, an access opening to the inner space formed in an end neck portion of the container, said neck portion being of reduced transverse dimension relative to the transverse dimension of the container, a supply of adsorbent particles substantially filling said inner space, and gas distribution means secured in the access opening of said neck and including a head having a body portion engaged in the neck, said body portion having first and second communicating passages therein; a dipping tube having one end supported by the body portion, said dipping tube being narrower than and extending through said first passage into the inner space through said adsorbent particles, said second passage being in gas flow communication with said inner space through said access opening via said first passage, and said dipping tube and second passage establishing inlet and outlet structures for said adsorber unit.

2. The adsorber unit of claim 1, wherein said dipping tube has another end formed with a plurality of openings, each smaller than an adsorbent particle.

3. The adsorber unit of claim 2, wherein said other end of the dipping tube has a conical shape for facile penetration within the adsorbent particles.

4. The adsorber unit of claim 3, wherein said other end of the dipping tube is formed by an end tube portion slidingly mounted on the dipping tube.

5. The adsorber unit of claim 4, wherein said inner chamber extends through the body portion and further including a fluid connection member mounted into one end of said inner chamber and to which said one end of the dipping tube is secured.

6. The adsorber unit of claim 1, wherein said body portion of said head is threadedly engaged in the access opening and has an inner chamber communicating with the second passage and through which extends said one end of the dipping tube.

7. The adsorber unit of claim 1 wherein said first passage is concentric with and surrounds said dipping tube.

8. A gas separation plant comprising at least two adsorber units according to claim 1 connected to first circuit means for a feed gas mixture and to second circuit means for delivering a separated product gas.

9. The plant of claim 8 comprising storage means for storing feed gas mixture, the storage means consisting of a plurality of gas containers of the type substantially identical to the adsorber unit container.

10. The plant of claim 8 comprising storage means for storing separated gas product, the storage means consisting of a plurality of gas containers of the type substantially identical to the adsorber unit container.

* * * * *

UNITED STATES PATENT AND TRADEMARK OFFICE
CERTIFICATE OF CORRECTION

PATENT NO. : 5,133,787

DATED : July 28, 1992

INVENTOR(S) : Christian Diot et al.

It is certified that error appears in the above-identified patent and that said Letters Patent is hereby corrected as shown below:

ON THE TITLE PAGE:

Please add, Item [73] Assignee:

--L'AIR LIQUIDE, SOCIETE ANONYME POUR L'ETUDE ET
L'EXPLOITATION DES PROCEDES GEORGES CLAUDE--

Signed and Sealed this

Twenty-first Day of September, 1993

Attest:

BRUCE LEHMAN

Attesting Officer

Commissioner of Patents and Trademarks